(12) United States Patent
Fredriksson

(10) Patent No.: US 10,050,965 B2
(45) Date of Patent: Aug. 14, 2018

(54) CONFIRMING DATA ACCURACY IN A DISTRIBUTED CONTROL SYSTEM

(71) Applicant: Concio Holdings LLC, Winnetka, IL (US)

(72) Inventor: Lars-Berno Fredriksson, Kinna (SE)

(73) Assignee: CONCIO HOLDINGS LLC, Winnetka, IL (US)

( * ) Notice: Subject to any disclaimer, the term of this patent is extended or adjusted under 35 U.S.C. 154(b) by 0 days.

(21) Appl. No.: 15/341,308

(22) Filed: Nov. 2, 2016

(65) Prior Publication Data

US 2017/0126679 A1  May 4, 2017

Related U.S. Application Data

(60) Provisional application No. 62/249,612, filed on Nov. 2, 2015, provisional application No. 62/316,032, filed on Mar. 31, 2016.

(51) Int. Cl.
  *G06F 7/04* (2006.01)
  *H04L 29/06* (2006.01)
  *H04L 12/40* (2006.01)

(52) U.S. Cl.
  CPC .......... *H04L 63/0876* (2013.01); *H04L 12/40* (2013.01); *H04L 63/101* (2013.01); *H04L 63/123* (2013.01); *H04L 2012/40215* (2013.01)

(58) Field of Classification Search
  CPC . H04L 63/0876; H04L 63/101; H04L 63/123; H04L 12/40; H04L 2012/40215
  USPC .......................................................... 726/4
  See application file for complete search history.

(56) References Cited

U.S. PATENT DOCUMENTS

| 7,337,316 | B1 | 2/2008 | Evans | |
| 8,737,426 | B1* | 5/2014 | Fredriksson | H04J 3/0602 370/464 |
| 8,897,319 | B2* | 11/2014 | Fredriksson | H04L 29/0619 370/464 |
| 9,419,737 | B2* | 8/2016 | Fredriksson | H04J 3/0614 |
| 9,432,488 | B2* | 8/2016 | Fredriksson | H04J 3/07 |
| 2006/0089994 | A1 | 4/2006 | Hayes | |
| 2012/0216037 | A1 | 8/2012 | Simcoe | |
| 2014/0280636 | A1 | 9/2014 | Fredriksson | |

FOREIGN PATENT DOCUMENTS

EP  2835941  2/2015

OTHER PUBLICATIONS

International Search Report for PCT/US2016/060056 dated Feb. 13, 2017; 3 pages.
Written Opinion for PCT/US2016/060056 dated Feb. 13, 2017; 7 pages.

* cited by examiner

*Primary Examiner* — Samson Lemma
(74) *Attorney, Agent, or Firm* — Fitch, Even, Tabin & Flannery LLP

(57) ABSTRACT

A control network communication arrangement includes a second protocol embedded into a first protocol in a way that modules supporting the second protocol may be aware of and utilize the first protocol whereas modules supporting only the first protocol may not be aware of the second protocol. Operation of modules using the second protocol does not disturb operation of the modules not configured to use or understand the second protocol. By one approach, unique additional information is embedded into a message to provide authentication of the first protocol message. This acts as a quality check protecting against unauthorized messaged being sent on the control network.

15 Claims, 6 Drawing Sheets

PRIOR ART

CONFIRMING DATA ACCURACY IN A DISTRIBUTED CONTROL SYSTEM

RELATED APPLICATIONS

This application claims the benefit of U.S. provisional application No. 62/249,612 filed Nov. 2, 2015, and U.S. provisional application No. 62/316,032 filed Mar. 31, 2016, the entireties of each of which are incorporated by reference herein.

TECHNICAL FIELD

This invention relates generally to electronic communications and more specifically to a data authentication using high speed protocols for control networks.

BACKGROUND

Electronic devices communicate with each other in a variety of ways, often based upon the requirements of a given context. One such context is that of control systems. Unlike simple communication systems where the system merely allows for communication among the devices communicating on the system, control systems communicate for the purpose of explicit control over the modules connected to communicate over the control system. Such systems then allow other applications to run on the various modules. Those applications in a distributed embedded control system, however, should work in concert.

To provide that group control, most distributed embedded control systems are built around a communication protocol standard, examples of which include CAN (ISO 11898), SERCOS, FlexRay, EtherCAT, and sometimes even Ethernet among others. Higher layer protocols are embedded on top of the communication standard to provide rules for data exchange among participating applications at Electronic Control Units participating in the control network, timing rules, sequence rules, and the like to facilitate communications between the distributed applications that are exchanging information. CANopen, DeviceNet, SDS, J1939, and NMEA 2000 are just a few examples of protocols that are layered on top of the CAN standard. Even meta protocols like CanKingdom are used, by which higher layer protocols can be constructed and optimized for specific distributed embedded control systems. A still further extension of CAN systems includes the CAN-FD protocol. Although the CAN-FD protocol's speed is increased over previous CAN-based systems, the maximum message length is still limited to 64 bytes. Such a system lacks in flexibility for system designers.

Additional background regarding certain prior teachings regarding such messaging protocols can be found in U.S. Pat. No. 7,711,880 titled Schematizing Of Messages In Distributed Control And Supervision, U.S. Pat. No. 7,472,216 titled Variable Oscillator For Generating Different Frequencies In A Controller Area Network (CAN), U.S. Pat. No. 7,899,936 titled Device In A Modularized System For Effecting Time-Stamping Of Events/Reference Events, and U.S. Pat. No. 7,478,234 titled Distributed Control And Monitoring System, each of which is incorporated by reference herein in their entireties.

Another problem is that of message authentication in the case of a third party hacking into a communication network. Currently, most defenses to this type of attack rely on traditional encryption technology. This technology, however, requires distribution of keys that have to be kept secret and its implementation requires extra bandwidth, which exacerbates the ongoing bandwidth concerns for CAN-based protocols.

SUMMARY

Generally speaking, pursuant to these various embodiments, a second protocol is embedded into a first protocol in a way that modules supporting the second protocol may be aware of and utilize the first protocol whereas modules supporting only the first protocol may not be aware of the second protocol. Operation of modules using the second protocol does not disturb operation of the modules not configured to use or understand the second protocol. Use of the second protocol can be used to add additional information that can protect against various potential network vulnerabilities. For example, one solution to the problem of third party network hacks is to include a message authentication code or identifier with every message. For example, each of a set of nodes (or every node) of the network can have a unique, dedicated identification code that it sends with every message sent from that node. The other nodes can confirm authenticity of a received message by confirming that the identification code received with the message corresponds to a known code for a network node. Also, if a node receives a message that it did not send that includes its identification code, it will respond by issuing an error flag so that the other nodes on the network know to ignore that message. The second protocol can be used to embed this additional information without negatively impacting bandwidth for the primary protocol.

In one particular example, the first protocol may be CAN protocol, and the second protocol is a protocol that embeds bits into portions of the CAN protocol. For example, bits of a CAN protocol typically include several bit quanta, and the CAN protocol operates by looking for particular signal levels at particular portions or bit quanta of the individual bits. By one approach, therefore, the second protocol can include sending additional information within the CAN message packet using bit quanta of Prop-Seg bits of the CAN message packet other than the defined bit quanta. In another approach, bit lengths of the bits of a message packet can be varied to transmit additional data. In still another approach, voltage levels between maximum and minimum expected voltage values for the defined bit quanta of the message packet can be defined to transmit more than logical "0" and "1" for a given bit quantum other than the bit quantum set for data transmission for the primary protocol. Using any one or combination of these approaches to embedding additional information can be used to provide additional bandwidth, which additional bandwidth can be used for any purpose including sending identification information as described herein.

Accordingly, through application of these methods of embedding more information into an otherwise standard protocol such as CAN or CAN-FD, better authentication of the primary protocol's message can be achieved. For example, the embedded protocol can also be used for improved error checking of the transmitted messages or embedding longer and more secure authentication codes or keys with the primary message. These and other benefits may become clearer upon making a thorough review and study of the following detailed description.

Figure 1:
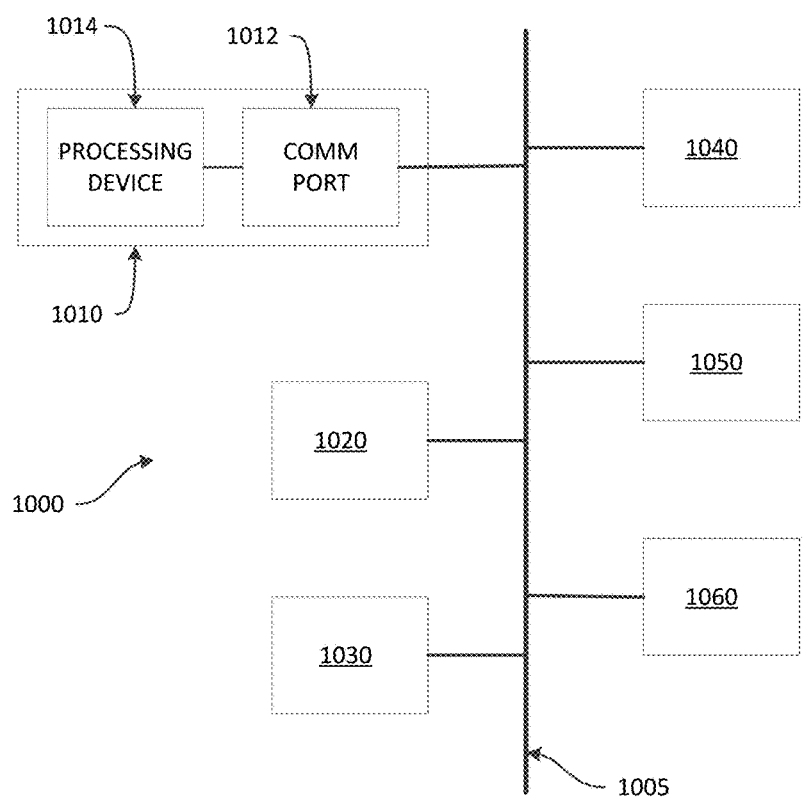
FIG. 1 comprises a block diagram of an example control network as configured in accordance with various embodiments of the invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, message authentication can be provided in embedded portions of a transmitted message. Network security is an increasing concern in all contexts. One weakness of certain systems is the ability of an outside and unauthenticated device to send messages on a control network. The security issue may be addressed by including message authentication embedded within a given message.

In one such approach, the control network is configured such that one or more of the nodes are configured to transmit messages including an authentication indicator embedded within the message. For instance, each node may have an identifier or code that is unique to each module or node on the control network. Then the modules will embed that identifier or code as the authentication indicator as part of the second or embedded message within the primary message. The receiving modules check this authentication identifier to confirm that it matches a known code, i.e., an identifier known to be uniquely associated with a module on the control network. In addition or alternatively, the receiving modules will each compare the authentication identifier of the message to its own unique identifier or code. If the authentication identifier for the received message matches that of the receiving module, the receiving module issues an error or other flag on the control network to indicate that the previous message is insecure because no other modules should have transmitted a message using that authentication identifier. In other words, there is a high likelihood that received message was transmitted by or on behalf of an unauthorized device that is trying to mimic the receiving module so as to transmit unauthorized messages.

Such message authentication can be applied to any of the above described message approaches. For example, the authentication identifier may be sent in any portion of the transmitted message using the embedded protocol approaches described herein. In another approach, the authentication identifier may be sent using a higher or lower bit rate portion of a message sent using a protocol utilizing multiple bit rates, such as the CAN-FD protocol.

Referring now to the drawings, and in particular to FIG. 1, an illustrative system that is compatible with many of these teachings will now be presented. In FIG. 1, a control network 1000 is illustrated having various devices communicating over a bus 1005, but these teachings can apply to control networks having any of a variety of topologies. The communication device apparatus 1010 can be considered a module or node on the control network 1000 and include a communication port 1012 configured to connect to a control network 1000 according to the control network's topology. The communication device apparatus 1010 also includes a processing device 1014 operatively connected to the control network 1000 to control receiving and sending communications with other devices 1020, 1030, 1040, 1050, and 1060 over the control network 1000 via the communication port 1012. Those skilled in the art will recognize and appreciate that such a processor can comprise a fixed-purpose hard-wired platform or can comprise a partially or wholly programmable platform. All of these architectural options are well known and understood in the art and require no further description here.

An example implementation of embedding the second protocol message in the first protocol message will be described with reference to FIGS. 2-5 in the context of a CAN based system. The Controller Area Network (CAN) standard (International Standards Organization (ISO) 11898) is a commonly used protocol for distributed embedded control system although these general teachings can be applied on other protocols as well.

Figure 2:
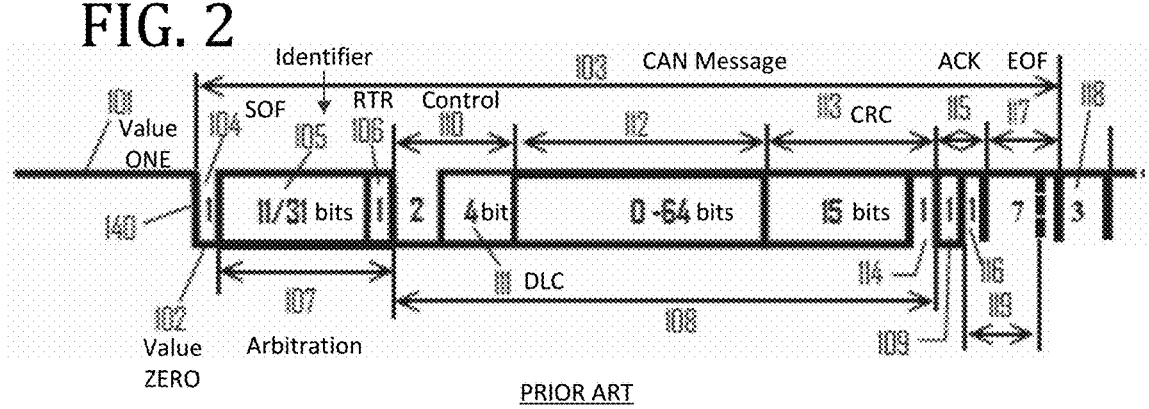
FIG. 2 comprises a schematic of a CAN message.

In this implementation, modules supporting the CAN protocol ISO 11898 can coexist with modules supporting a second protocol on the same bus by abstaining from taking advantage of one or more features of CAN. FIG. 2 shows some main characteristics of CAN. CAN is designed for a bus topology and works with two voltage levels, no voltage 101, representing the value "one," and voltage 102 representing the value "zero." This arrangement implies that a zero is dominant over a one; in other words, if a first transmitter transmits a one and a second transmitter a zero at the same time, then only the zero can be detected. An idle bus can be seen as a continuous stream of ones. A message 103 starts with a zero bit, the Start Of Frame (SOF) 104 followed by an Identifier 105 of eleven (Standard) or 29 (Extended) plus 2 protocol bits (totaling 31 bits) and a Remote Transmit Request (RTR) bit 106. The SOF and Identifier message portions constitute the Arbitration field 107 where bus collisions are resolved by bitwise arbitration. During the remaining part of the message 108 until the Acknowledgment bit (ACK) 109, there is only one transmitter on the bus because the other transmitters are controlled to not be active in response to these initial message portions; specifically, after the arbitrations portions of the message, ending with the RTR, only one transmitter will be sending while all other communication units will only receive bits per the protocol. This remaining part of the message 108 starts with a Control Field 110 with two dominant bits and a four-bit Data Length Code (DLC) 111 indicating the length of the following Data Field 112, which can contain no data (DLC=0) or up to eight bytes (DLC=8). In other words, the Data Field 112 of the standard CAN message can be from 0 to 64 bits long. The message is checked by a 15 bit CRC code placed in the sixteen bit CRC field 113, where the last bit is the CRC delimiter 114. The ACK field 115 contains the ACK bit 109 followed by a recessive bit, the ACK delimiter 116. The remaining part of the message 103 is the End Of Frame (EOF) field 117 containing seven consecutive recessive bits. Three recessive bits, the Intermission 118, have to pass before the bus is free for new messages.

Figure 3:
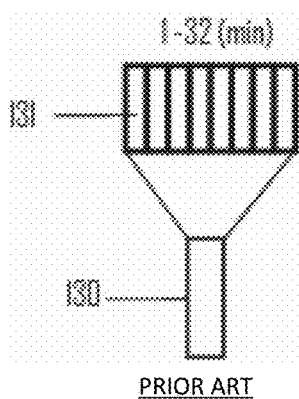
FIG. 3 comprises a schematic of an example CAN time quantum.

According to the CAN specification (ISO 11898-1), a bit is constructed of time quanta. With reference to FIG. 3, a single bit quantum for the standard CAN message is depicted as time quantum 130, which is a fixed unit of time derived from the oscillator period 131 of the transmitter/receiver's clock. The time ticks 131 may alternatively be derived from a separate oscillator or clock. A programmable prescaler with integral values ranges from at least one to thirty-two to define the time quantum as a given number of a minimum time quantum. Accordingly, starting with the minimum time quantum, the time quantum shall have the length of Time quantum=$m$·minimum time quantum where m is the value of the prescaler.

Figure 4:
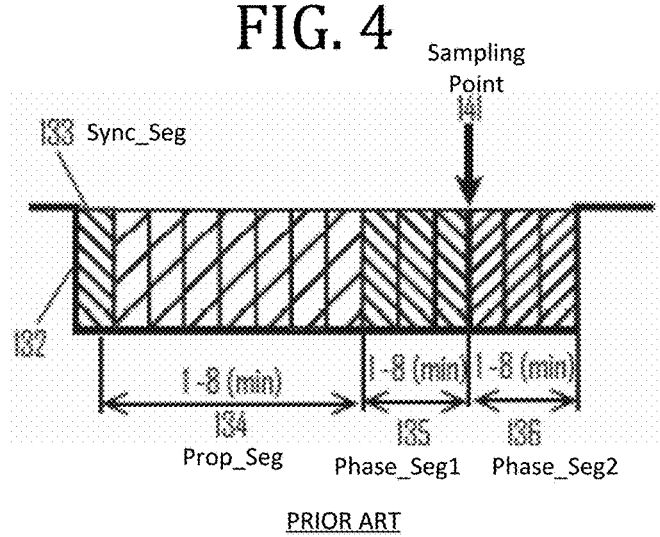
FIG. 4 comprises a schematic of an example CAN bit.

In operation, therefore, another example CAN bit 132 as illustrated in FIG. 4 is constructed of individual time quanta. The first time quantum is the Sync_Seg 133 followed by the Prop_Seg (Propagation Segment) 134 consisting of one up to at least eight time quanta. The propagation segment is defined according to a period of time to make sure a signal wave can propagate from the transmitter to the far end of the bus and back, which would also correspond to the amount of time needed for the furthest module on the control network to receive the message and respond. Accordingly, the Prop_Seg length is set to allow for the bit arbitration aspect of the CAN protocol to work. The final part of the CAN bit 132 includes the Phase Segments, Phase_Seg1 135 and Phase_Seg2 136. The phase segments are symmetrical, each having one or up to at least eight time quanta long. The phase segments take up the time skew between the different nodes in the system. A CAN bit should then be programmable from 4 to at least 25 time quanta.

All clocks in a CAN system are assumed to be unsynchronized. When a SOF 104 is transmitted, each module's bit-representation is synchronized to the falling edge 140, and each module counts the number of time quanta specified for Prop_Seg and Phase_Seg1. For example, the internal clock of a module that receives the falling edge can determine the timing of the expected sampling point within the resolution of that internal clock; i.e., by knowing the definition of the bits in the internal clock the module can calculate the location of the sampling point relative to the internal clock. In CAN this is typically done by time quanta unit where each time quanta is a number of local clock elements. The voltage of the signal is measured at the Sampling Point 141. If the voltage is still present, the module decides that a SOF is detected and the following voltage shifts are decoded according to the CAN specification. If there is no voltage at the Sampling Point 141, the falling edge is regarded as a glitch and ignored. This feature can be seen as a low pass filter, filtering out disturbances on the bus, for example, due to wave reflections. Such features make CAN dependable and forgiving in bad wiring installations.

More elaborate information about CAN can be found in the ISO standard 11898 and the article "The Configuration of the CAN Bit Timing" by Florian Hartwig and Armin Bassemir (Robert Bosch GmbH, Abt. K8/EIS), presented at 6th International CAN Conference 2nd to 4th November, Turin (Italy), published by CAN in Automation (CiA), Nurnberg Germany, which materials are incorporated by reference in their entireties herein.

With this background, portions of the message packet can be modified in certain defined ways to convey additional information beyond the data (e.g., zero or one) sent via a particular voltage at the sampling point for a given bit. In this way, a module can send an authentication identifier embedded within the message packet using a portion of the message packet other than the defined bit quanta. Receiving modules of the common control network receive the authentication identifier, for example, by extracting it from the defined modified portions of the message packet, and determine whether the message packet is an authorized message packet based on the authentication identifier.

The determination about whether the packet is an authorized message packet can be performed, for instance, by comparing the authentication identifier to a list of authentication identifiers of modules connected to the common control network. This list can be stored on a memory within the module or in a memory readily accessible by the receiving module. For example, a control module for the common control network may compare the authentication identifier to a list that it stores or to which the control module can refer.

In another approach, the receiving module compares the authentication identifier to the receiving module's authentication identifier and sends an error flag in response to determining that the authentication identifier matches the receiving module's authentication identifier. In this way, the receiving module detects an imposter that is trying to send messages on the common control network and alerts the network upon detection of such an imposter message.

Figure 5:
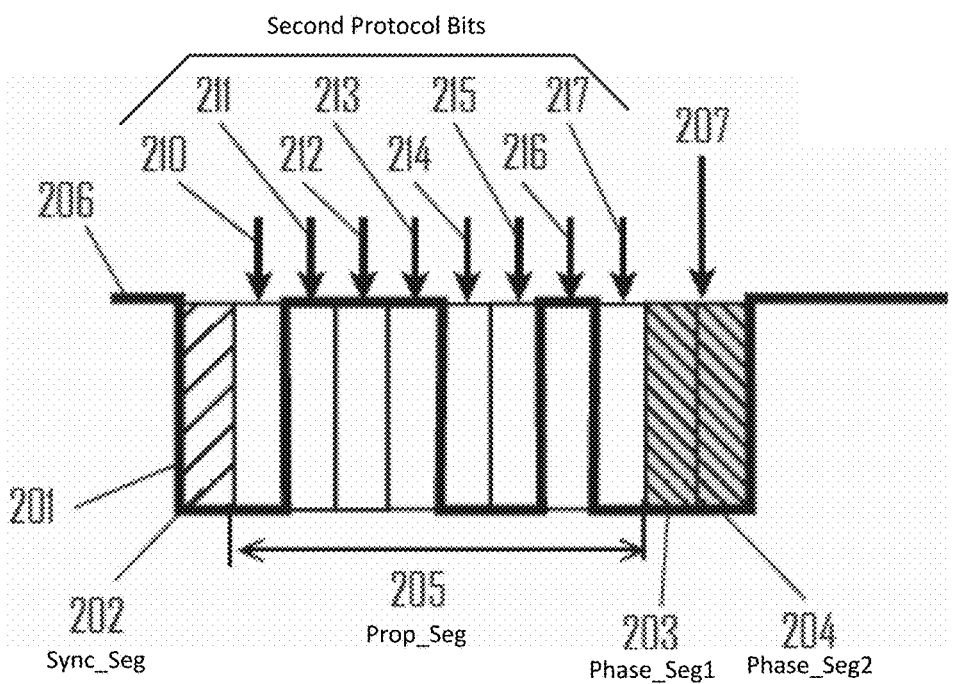
FIG. 5 comprises a schematic of an example of embedding a second protocol message in a portion of a first protocol message, here a Prop_Seg portion of a CAN message, as configured in accordance with various embodiments of the invention.

The method of modifying the message packet can any one or combination of a variety of methods. Turning to FIG. 5, one example approach is to modify a first protocol, here the CAN protocol, to embed a second, high speed protocol in portions of a standard CAN message. In such an approach, a processing device of a control network module can be configured to control the second protocol to use a bit rate higher than the first protocol's bit rate, for example, to control the second protocol to use a bit rate higher than the first protocol's bit rate. In other words, because each bit of the message packet includes several bit quanta other than the bit quanta defined for the sampling point to determine the logical value of the bit, the sending module can set a voltage value for the bit quanta other than the defined bit quanta to either the maximum expected voltage value or the minimum expected voltage values for the defined bit quanta. Examples of such an embedded protocol are described in U.S. Pat. Nos. 8,737,426 and 9,419,737, each of which is incorporated here by reference. The rate of bits in the second protocol is only limited by the clock resolution in the second protocol control logic. The number of bits in each time quanta can for example be 20 per 3 time quanta. In any event, the effect is that the processing device of a module is configured to implement the second protocol by adding bits inside of individual bit quanta of the first protocol. In other words, a CAN message packet can be defined by bits having a plurality of bit quanta, and data for the CAN message packet is defined by a signal level at defined bit quanta of a bit where the defined bit quanta are less than every bit quanta of a bit. For instance, a standard CAN bit uses defined bit quanta including a first bit quantum of a respective bit, which first bit quantum is a Sync_Seg bit, and a sample point bit quantum of the respective bit. That sample point is typically between the Phase_Seg1 and Phase_Seg2 portion of the bit as illustrated in FIG. 4. The remaining, undefined bit quanta are available for use in the second protocol. Thus, in one example, to embed the second protocol, the processing device is configured to send additional information within the CAN message packet using bit quanta of Prop-Seg bits of the CAN message packet other than the defined bit quanta checked by the nodes using the standard CAN message protocol.

More specifically, FIG. 5 shows an example CAN bit with a Propagation Segment 205 of eight time quanta and two phase segments 203 and 204 of one time quantum each. The bit starts with the Sync_Seg 202 where any voltage shift 201 is done during this time. The voltage level over the bit time is depicted by the bold line 206. The modules supporting the second protocol would use the Prop_Seg for an embedded high speed bit stream by sampling the voltage value of each time quantum and decode the value according to the CAN rules, where a sensed voltage is decoded as zero and no voltage as one. Modules supporting only the original CAN protocol would decode the falling edge 201 as a synchronization or resynchronization edge and ignore the following voltage shifts. The voltage level at the sample point 207 is dominant and the CAN module will decode the bit correctly to a zero. Modules supporting the second protocol would decode the sample points 210 to 217 as follows: 210=0; 211=1; 212=1; 213=1; 214=0; 215=0; 216=1; 217=0. Here, the processing device for the module is configured to use same voltage levels for signal designations for both the first protocol and the second protocol, although this is not necessary. Indeed, the processing device may instead be configured to implement the second protocol by adding bits inside of individual bit quanta of the first protocol not measured to be a particular level according to the first protocol. Also, although the width of the illustrated second protocol bits or sample points are illustrated as having the same width of first protocol sample points, other time lengths different from that of the first protocol sample points are possible. The number of second protocol bits place in the propagation segment is only limited by the physical layer performance and the clock resolution in the controller logic handling the second protocol.

In another modification, voltage levels other than and between those of the logical "zero" and "one" can be used to convey additional information. In this approach, a sending module sets a voltage value for the bit quanta other than the defined bit quanta to defined values other than and between maximum and minimum expected voltage values for the defined bit quanta. These other values are defined for the system to correspond to other logical values, e.g., "two," to provide additional bandwidth for information within the message packet.

Figure 7:
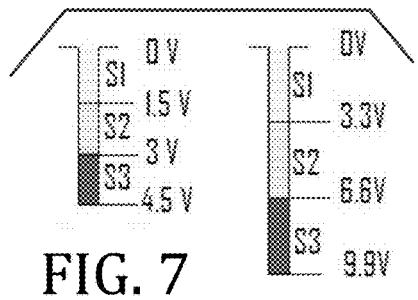
FIG. 7 comprises graphs illustrating two example differential voltage ranges for a voltage modulation approach configured in accordance with various embodiments of the invention.
Figure 6:
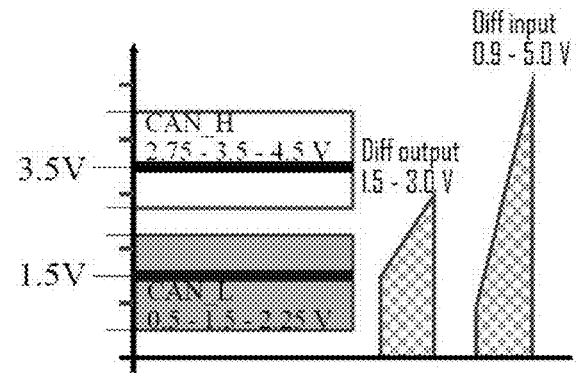
FIG. 6 comprises a graph differential voltage values recognized by CAN modules.

More specifically, for a CAN message, the Sync_Seg bit can include voltage modulation such as this. The Sync_Seg is regarded dominant by a CAN FD controller when it reads a differential voltage between 0.9 V and 5 V after sampling a recessive bit. This is a wide range that can be used for voltage modulation. FIG. 6 shows the detailed dominant voltage ranges according to the CAN standard. The CAN_H and CAN_L as well as the differential voltages could be used for modulating the Sync_Seg. FIG. 7 shows two example ways to modulate the differential voltage in three steps, with the respective ranges labeled with logic values S1, S2, and S3. In one, the differential voltage is set to three steps 1.5 V, 3.0 V, and 4.5 V that are within the CAN standard. A second, a more aggressive modulation uses steps of 3.3 V, 6.6 V, and 9.9 V. From a silicon implantation point of view, the voltage nominal levels 2.1 V, 3.5 V, and 4.9 V might be preferred as these levels could easily be discriminated at the levels 1.4 V, 2.8 V, and 4.2 V by diodes with 0.7 V voltage drop.

Figure 8:
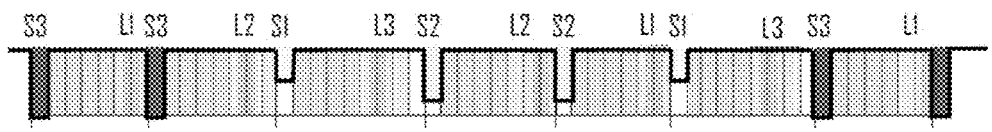
FIG. 8 comprises a schematic of an example portion of a message packet modified in accordance with various embodiments of the invention.

FIG. 8 shows an end of frame (EOF) portion of an example message packet with different modifications described herein. Here, the EOF includes logic values embedded with the differential values labeled with S1, S2, or S3 symbols according to FIG. 7. In this example, the sequence S3 S3 S1 S2 S2 S1 S3 generates a signal pattern that could be read as 2 2 0 1 1 0 2. With this approach, $7^3=343$ different patterns can be provide using this S symbol voltage modulation approach. In another approach, a byte worth of data could be embedded using just a two level voltage differentiation, say 2.25 V and 4.5 V, and extending this approach into the first intermission bit of the message packet. Where the transmitter keeps all nodes in synchronization, the S symbol, i.e., multi-level voltage level approach, could even be extended to the third intermission bit.

Figure 9:
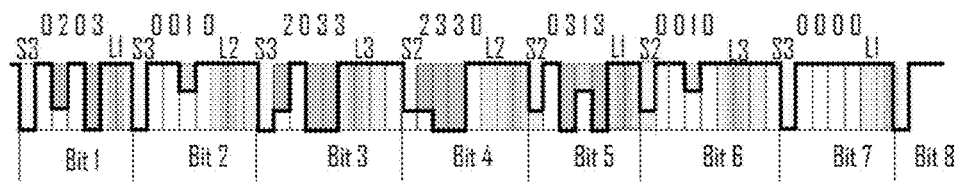
FIG. 9 comprises another schematic of an example portion of a message packet modified in accordance with various embodiments of the invention.

This voltage modulation approach can be extended to bits other than the Sync_Seg bit. For instance, the bits embedded in the Pro_Seg portion of a bit may be combined with the voltage modulation applied on the Sync_Seg in the S symbol approach described above. FIG. 9 shows an example on how to modulate these other bit portions to three levels 0, 1 and 2. Other levels could be chosen, e.g., two or four or more. The more levels, the more information that can be transmitted via the EOF and the two first intermission bits of a message packet. In illustrated example, four bits modulated with three voltage levels gives $9^{36}$ combinations. This equals a 57 bit binary. These modifications to the message packet can be combined into a five bit byte to get $9^{45}$ combinations, equivalent to a 71 bit binary. This is long enough for encryption keys and identification codes in many cases. The nominal bit chosen in the examples is the shortest. By extending the propagation segment to eight time quanta in the last example, this approach could carry a 128 bit binary. According to the CAN specification, it must be possible to program the nominal bit as shown below.

| Parameter | Separate prescaler | Shared prescaler |
| --- | --- | --- |
| Sync_Seg | 1 time quantum(N) | 1 time quantum(N) |
| Prop_Seg | 1 to 48 time quanta(N) | 1 to 96 time quanta(N) |
| Phase_Seg 1 | 1 to 16 time quanta(N) | 1 to 32 time quanta(N) |
| Phase_Seg 2 | 2 to 16 time quanta(N) | 2 to 32 time quanta(N) |

-continued

| Parameter | Separate prescaler | Shared prescaler |
|---|---|---|
| SJW | 1 to 16 time quanta(N) | 1 to 32 time quanta(N) |

The logic encoded using these approaches can be encoded using Manchester coding. This requires a doubling of the clock frequency. On the one hand this might be considered a disadvantage, but on the other hand an advantage because this includes use of an established standard (IEEE 802.3bw 100BASE-T-1 100 Mbit/s Ethernet over a single twisted pair for automotive applications).

Potential limits for the EOF encoding described herein are the same as for the CAN FD data bit rate, which depends on the combined quality of clocks, transceivers, and cables in the system. For implementing this approach in chips, the serial number of the chip or a random number may be transmitted as default, which allows for a system supervising node to detect if a module at a node in the system is exchanged. A receiving node also authenticates the transmitter. This, in combination with scheduling the message traffic, is often good enough to prevent system hacking.

In still another modification, the CAN protocol allows for some variation of the number of bit quanta within different portions of a bit as discussed below. With this option available, the control network's modules can be configured to recognize certain patterns in bit length changes as corresponding to certain logical values. U.S. Pat. No. 7,934,039 describes one approach to measuring the distance between flanks to an accuracy of one nanosecond, which supports such an approach to the message packet modification. Thus, a sending module can vary a number of bit quanta for the bits for the message packet, which the receiving modules will understand as conveying certain information.

Figure 10:
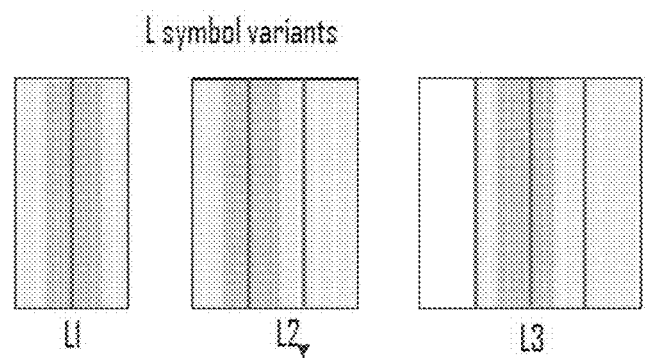
FIG. 10 comprises a schematic of three example bit quantum number variations in accordance with various embodiments of the invention.
Figure 11:
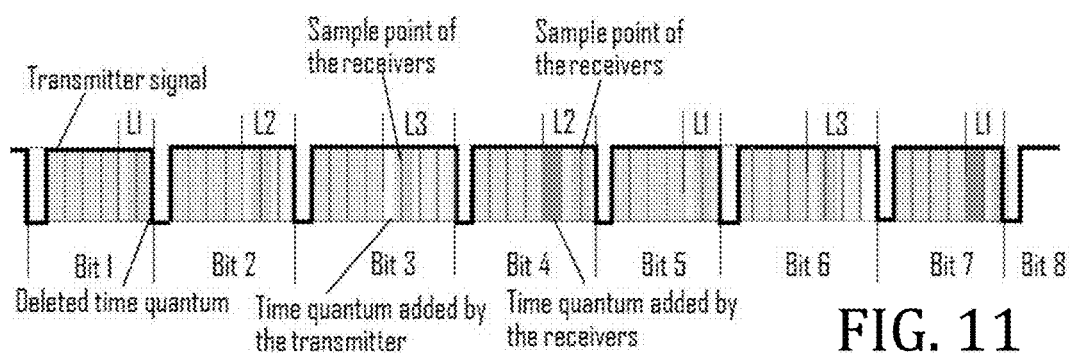
FIG. 11 comprises a schematic of an example portion of a message packet modified in accordance with various embodiments of the invention.

FIG. 10 illustrates three variants of bit quanta number variation that can be used to transmit additional logic symbols, labeled here as "L" symbol variants. For symbol L1, the transmitter shortens the Phase Seg 2 by one time quantum. For symbol L2, the transmitter keeps the nominal bit length, and for symbol L3, the transmitter adds a time quantum to Phase_Seg 1. FIG. 11 shows how the L symbol approach can be applied at an EOF of the message packet, in this example providing the pattern L1, L2, L3, L2, L1, L3, L1. Receiver modules find Bit 1 short and delete a bit quantum in Phase_Seg 2 in Bit 1. Bit 2 has a normal length. Bit 3 is one time quantum longer than the receivers expect, so they add a bit quantum to bit 4. Bit 5 is shorter than expected so receivers delete a time quantum in Phase_Seg 2. Bit 6 is longer than expected so the receivers add a bit quantum to Sync_Seg 1 in bit 7. The transmitter assigned L1 to Bit 7, but as the receivers have already added a time quantum to Phase_Seg1, they will sample at the falling edge. This may cause a bit failure. To avoid this situation, preferably a restriction logical restriction is added in the use of the L symbol whereby transitions from L3 to L1 are forbidden.

In another application, the L symbol, i.e., bit quantum number variation, can be used alone to create unique signal patterns in the EOF that will not disturb ordinary CAN FD modules. For EOF applications, we have $3^7-2^7=2059$ patterns. If we extend into the two first intermission bits, there are $3^9-2^9=19171$ patterns. The L symbol approach can be further applied to add more possible patterns by adding more time quanta to the nominal bit. According to the ISO 11898-1 2015 standard, it must be possible to choose the following values for CAN FD enabled controllers, which illustrates the number of possibilities for varying bit quanta numbers for conveying information:

| Parameter | Separate prescaler | Shared prescaler |
|---|---|---|
| Phase_Seg 1 | 1 to 16 time quanta(N) | 1 to 32 time quanta(N) |
| Phase_Seg 2 | 2 to 16 time quanta(N) | 2 to 32 time quanta(N) |
| SJW | 1 to 16 time quanta(N) | 1 to 32 time quanta(N) |

In yet another possible modification, the oscillator frequency used to keep the timing for each of the modules on the control network can be modified, which changes the total length in time for a given bit. For example, modern phase lock loop and voltage controlled oscillator technology can tightly control oscillator frequency to an accuracy of 0.02%, whereas the CAN standard only requires oscillator frequency accuracy of within 0.5%. Thus, through application of controlled variation of a sending module's oscillator frequency within this 0.02% to 0.5% range, the time length of a given bit can be modified in a defined manner such that a receiving module can determine the change in the received bit's time length and associate that change with a particular logic value.

So configured, message protocols with limited bandwidth can still take advantage of more robust message authentication techniques that were otherwise not possible because of the primary protocol's bandwidth limitations. One advantage to several of the above approaches is that the modifications to the message packet occur at the physical layer, i.e., the voltage present on the communication network physical layer. Thus, a given sending module's own unique physical attributes, i.e., delay, lag, oscillation profile, or the like, becomes part of that module's unique signature or fingerprint, which can provide a further authentication of a given message.

For example, the amount of bit time length modification provided by a given module may be slightly different from that of other modules using the same modification protocol. This slight difference can be learned and stored by the other modules on the common control network during a configuration mode for the network. Thus, any such physical layer unique properties can be included in the authentication process of a given message.

Also, to the extent that these modifications require time synchronization of the various modules on the control network, the primary protocol can be modified to include well placed falling flanks that force a high synchronization frequency for the modules. U.S. Pat. No. 8,897,319, incorporated by reference herein, describes in detail how the Sync_Seg of a bit can be manipulated within the rules of the CAN standard. In short, a dominant Sync_Seg can be sent at the start of every recessive bit, and a recessive Sync_Seg can be sent at every consecutive dominant bit (not the first one). Because in CAN FD every receiver shall make a hard resynchronization at the edge between the FDF bit and the following dominant res bit, a receiver could synchronize a counter to the start of each bit after the hard resynchronization at the end of the FDF bit. As the transmitter then is the only one transmitting until the ACK bit, it can transmit a Sync_Seg with the opposite sign rule in each bit and vary its respective length in respective following bits within the Prop_Seg. It can also vary the length of the bits within the limits given by the 0.5% oscillator tolerance requirement for CAN. In this way, the transmitter can generate a series of raising and falling flanks separated in time that forms a unique signature of itself.

Figure 12:
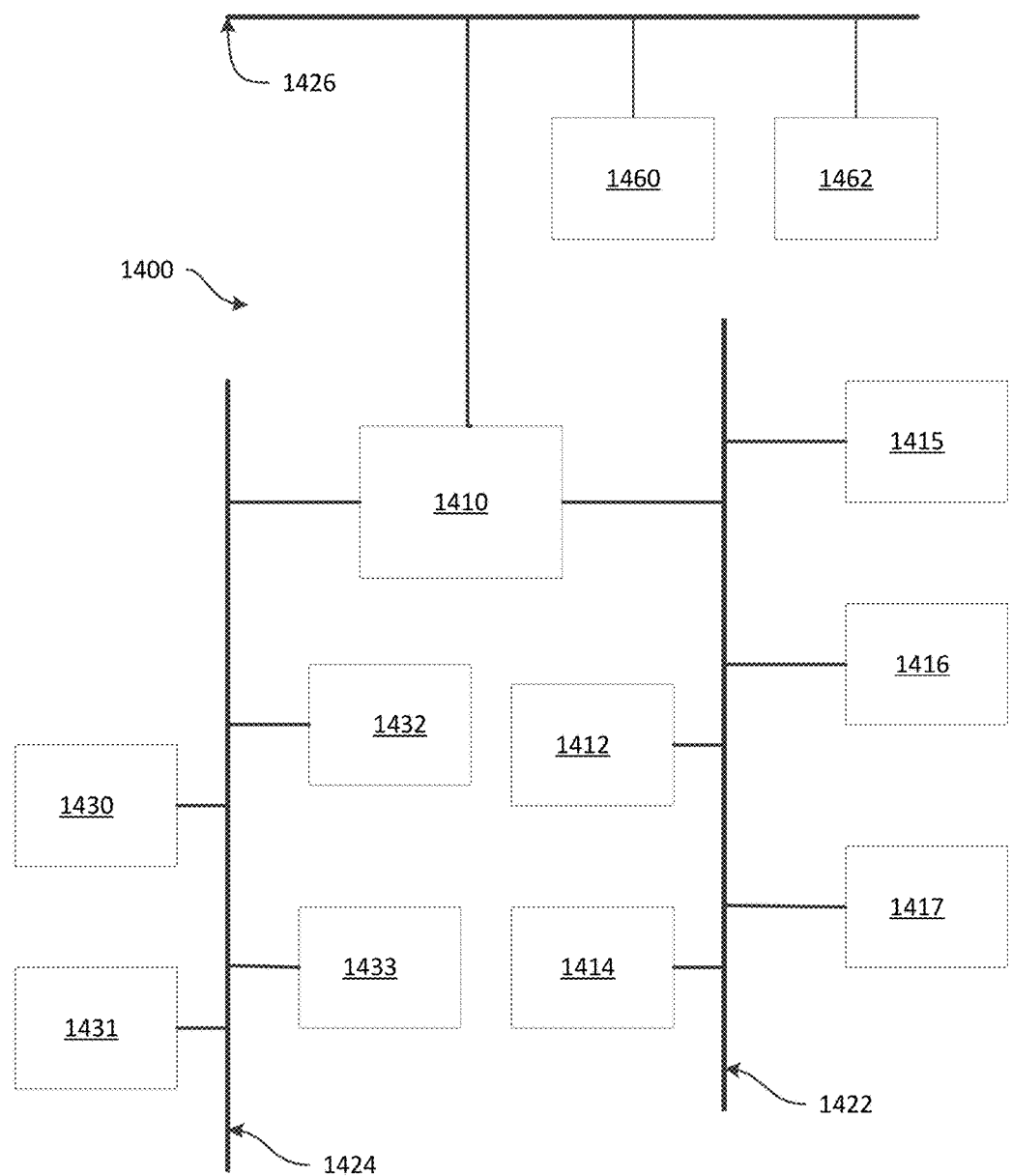
FIG. 12 comprises a block diagram of an example control network having a star topology as configured in accordance with various embodiments of the invention.

The various protocols and modifications described herein may also be applied in different control network topologies. In one example illustrated in FIG. 12, a CAN-based control network 1400 has a star topology with an active hub device 1410 in the center. The active hub device 1410 is configured to connect to a plurality of CAN channels 1422, 1424, and 1426 of the control network 1400 and act as a gateway among two or more of the plurality of CAN channels 1422, 1424, and 1426. For example, the active hub device 1410 can be an ECU connected to communicate on each of the multiple CAN channels 1422, 1424, and 1426, each channel having its own modules 1412, 1414, 1415, 1416, 1417, 1430, 1431, 1432, 1433, 1460, and 1462. In another example, the active hub device 1410 could be three separate controllers only linked by software mapping messages or information between the three different buses. In still another example, the active hub device 1410 could also be a combined logic designed to transfer messages between the different buses more or less in real time. Additionally, the methods described herein can be implemented into so-called "bridge" devices that allow for use of CAN and CAN-FD modules on that same communication network such as described in U.S. Pat. App. Pub. No. 2016/0286010, which is incorporated by reference in its entirety herein.

In an additional alternative embodiment, the functionality or logic described in herein may be embodied in the form of code that may be executed in a separate processor circuit. If embodied in software, each block of functionality or logic may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code. If embodied in hardware, each block may represent a circuit or a number of interconnected circuits to implement the specified logical function(s). Accordingly, a computer readable medium (being non-transitory or tangible) may store such instructions that are configured to cause a processing device to perform operations as described herein. One skilled in the art will understand the hardware approach to include field programmable gate arrays (FPGA), microcontrollers, and the like.

Figure 13:
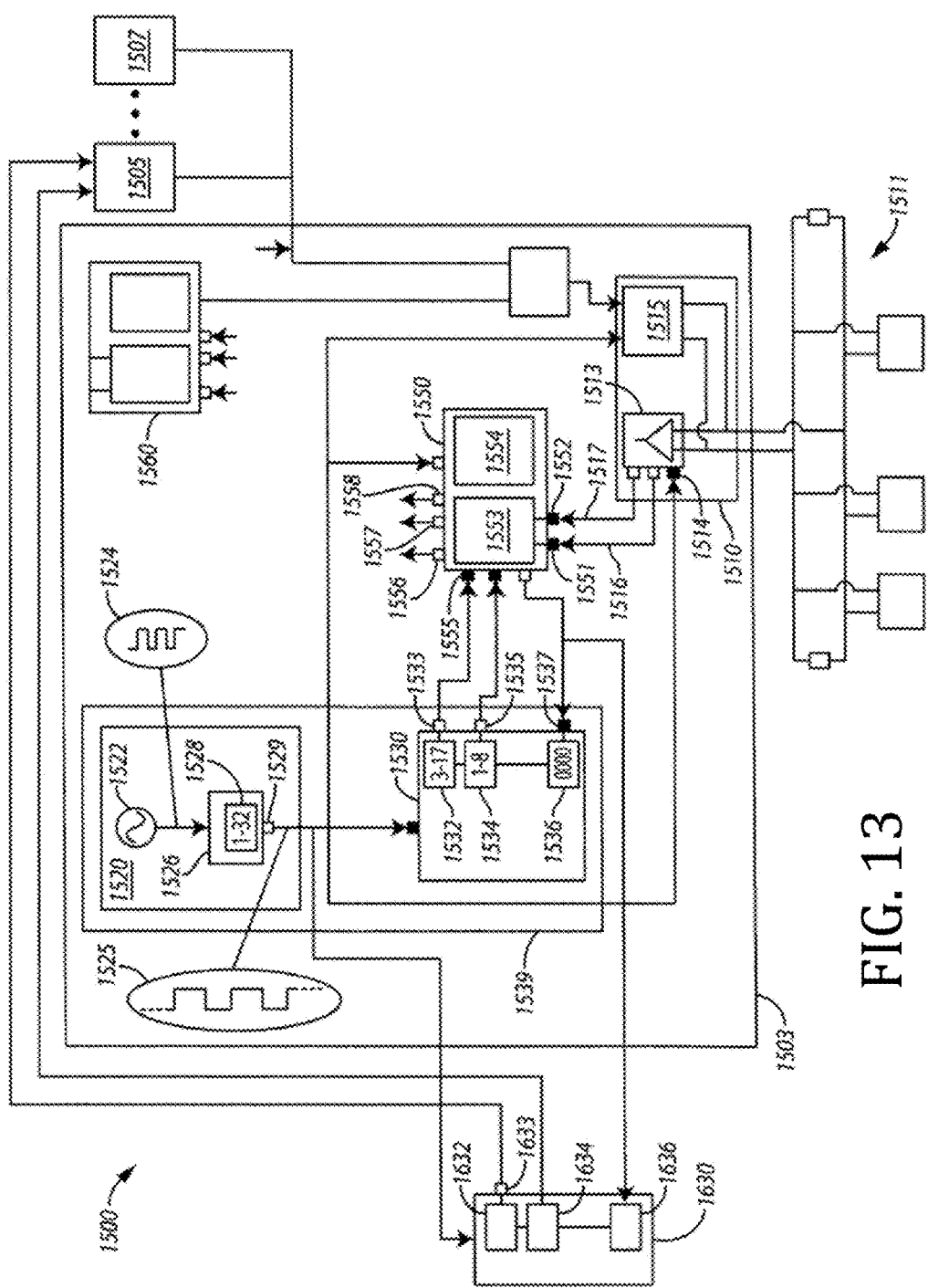
FIG. 13 comprises a block diagram of an example communication device as configured in accordance with various embodiments of the invention.

Turning to FIG. 13, a specific implementation of using a second protocol or modifying a message packet inside a CAN protocol will be described. Unlike specific implementations where a single processing device would prepare and send (and receive) both the first protocol and second protocol messages in a combined CAN/second protocol messages, two or more processing devices can act in parallel to handle different portions of the combined message. This aspect can be scalable where different processing devices are tasked with handling specific bit quanta or portions of a given sent or received message.

More specifically, in the example of FIG. 13, a communication device apparatus 1500 includes a communication port 1510 configured to connect to a control network 1511. A processing device for the communication device apparatus includes a first processing device 1500 configured to control the communication device apparatus for CAN communication arbitration and to control communication of the CAN message packet. The processing device also includes at least a second processing device 1505 and 1507 configured to control communication of at least a portion of the additional information over at least one of the bit quanta other than the defined bit quanta. In the illustrated example, the at least a second processing device includes separate processing devices 1505 and 1507, each configured to control communication of at least a portion of the additional information over a different one of the bit quanta other than the defined bit quanta. More or fewer processing devices can be so added, and different processing devices can have differing amounts or specific bit quanta assigned for analysis or generation.

In such an approach, the communication port 1510 is operatively connected to the first processing device 1500 to send the CAN message packet over the control network 1511 and the at least a second processing device 1505 to send the additional information over the control network 1511. Moreover, the communication port 1510 is configured to connect to the control network 1511 to receive CAN message packets transmitted over the control network 1511 and operatively connected to provide the received CAN message packet to the first processing device 1503 to read CAN message data and to provide the received CAN message packets to the at least a second processing device 1505, 1507 to read additional information in the CAN message packet. In the illustrated example, the communication port 1510 includes separate receiving (bus level indicator) 1513 and transmitting 1515 portions, although other configurations that substantially combine these aspects together are possible.

FIG. 13 further illustrates one example approach toward implementing a more precise clocking of the device to effect the ability to read and second data embedded within individual bits of a standard CAN message. In this example, a time event generator 1520 is operatively connected to at least two registers 1532 and 1632. The time event generator 1520 generates time ticks at a specific rate. The registers 1532 and 1632 are part of separate time counters 1530 and 1630. A first register 1532 of the at least two registers counts ticks received from the time event generator 1520 and in response to counting a first number of ticks to output a first trigger signal at output 1533 and resets. A second register 1632 of the at least two registers counts ticks received from the time event generator and in response to counting a second number of ticks to output a second trigger signal at an output 1633 and resets.

The first register 1532 provides the first trigger signal to the first processing device 1503 where the first trigger signal corresponds to a sampling time for the CAN message packet. The second register 1632 provides the second trigger signal to at least one of the at least second processing device 1505 where the second trigger signal corresponds to a sampling time for the additional information sent within the CAN message packet. In this manner, the registers 1532 and 1632 help the processing device track when to sense for voltage signals in a received packet or when to provide a signal in a sent packet. Sometimes these registers need to be reset to effect a resynchronization of the communication device apparatus with other communication modules on the control network 1511. In one approach, a reset device 1536 senses a start of frame and is connected to reset the at least two registers 1532 and 1534 in response to sensing the start of frame. In the illustrated approach, the reset device 1536, 1636 of each of the respective time counters 1530 and 1630 receives an output signal provided from the CAN bit recognizer module 1550 in response to sensing a start of frame signal on the control network 1511. Although the different registers used to provide time events for different sampling rates are illustrated in different modules 1530 and 1630, the registers need not be so separated in a given implementation.

Referring again to the example of FIG. 13, the time event generator 1520 includes an oscillator 1522 that outputs a time events 1524 to a TC 1526. The CAN standard defines a "time quantum" as follows: "The time quantum shall be a fixed unit of time derived from the oscillator period. There shall exist a programmable prescaler, with integral values, ranging at least from one (1) to thirty-two (32). Starting with the minimum time quantum, the time quantum shall have a length of: Time quantum=m*minimum time quantum, where m is the value of the prescaler."

To define the time quanta, the TC 1526 includes a register 1528 that sets the limit for the LTime. Each time the register 1528 reaches its defined limit, it transmits a Time Quantum Event at its output 1529 and resets itself. The result is a stream of time-tick events, i.e., a stream of Time quanta 1525. The time event generator 1520 defines a LTD, programmable to span from 1 to 32 time events that can generate time quanta according to the CAN protocol. The LTC or time event generator 1520 is acting as a time-tick generator and feeding the time counter 1530 with time events. The time event generator 1520 and time counter 1530 form another local time counter 1539.

The time counter 1530 includes an event input 1537 that resets the counter 1530 in response to receiving an event. The first register 1532 in this example is programmable from 2 to 17 and transmits an event at the output 1533 when the first register 1532 reaches the programmed value. The second register 1534 is programmable from 1 to 8 and transmits an event at the output 1535 and resets the counter 1530 when the counter 1530 reaches the programmed value of the first register 1532 plus the programmed value of the second register 1534. According to the CAN specification, a CAN bit consists as a minimum of a Sync_Seg time quantum, one Prop_Seg time quantum, one Phase_Seg 1 time quantum, and one Phase_Seg 2 time quantum, i.e., four time quanta, and the maximum length is Sync_Seg plus 24 time quanta. The first register 1532 can be programmed to cover Sync_Seg plus Prop_Seg plus Phase_Seg 1, and the second register 1534 can be programmed to cover Phase_Seg 2. The local time counter 1539 will the count the number of time events representing a CAN bit and generate an event after Phase_Seg 1 and another one after Phase_Seg 2.

Such a local time counter 1539 is capable of supporting a CAN bit recognizer 1550 as well as a bus level indicator 1513. In the illustrated example, the bus level indicator 1513 has an event input 1514 that receives time events 1525 from the time event generator 1520. In response to receiving a time event from the time event generator 1520, the bus level indicator 1513 samples the bus voltage on the CAN bus control network 1511. If a voltage is detected, the bus level indicator 1513 transmits a voltage-event signal 1516 to an event input port 1551 of the bit recognizer 1550. If no voltage is detected, the bus level indicator 1513 sends a no-voltage-event signal 1517 to an event input port 1552 at the CAN bit recognizer 114. In this arrangement, therefore, the CAN bit recognizer 1550 receives either a voltage signal or a no-voltage event signal at each time-tick event generated by the time event generator 1520.

The CAN bit recognizer 1550 includes an event logic device 1553 and an event counter 1554 that counts time events 1525. The event logic device 1553 is operatively coupled to an input port 1555 connected to receive first register events from the time counter's 1530 first register 1532. When operating under the CAN specification, a bit's value is decided at the end of the Phase_Seg 1, in which case the first register 1532 stores a value that generates a first register event corresponding to an expected Sample Point Event for a given CAN bit. The first register event triggers the CAN bit recognizer 1550 to detect a voltage on the control network 1511 at the expected Sample Point Event, in response to which the event logic device 1553 outputs a recessive bit event (corresponding to a logic "one") at output 1556 in response to determining a no-voltage event from the bus level detector 1513. If a voltage event is detected at the Sample Point, the event logic device 1553 outputs a dominant bit event (corresponding to a logic "zero") at output 1557 unless the dominant bit event is a Start Of Frame event. A Start Of Frame event occurs upon detecting a logic "zero" after detecting ten or more consecutive Recessive Bits (logic "one").

The event logic device 1553 is also triggered to detect a voltage in response to receiving a Start Of Frame register event signal from a Start Of Frame register 1534, which in this example is operatively connected to the first register 1532 and programmed to start counting time events in response to receiving an event from the first register 1532. After reaching the time event count programmed into the Start Of Frame register 1534, it outputs a Start Of Frame check event via an output 1535 to the event logic device 1553 to trigger the event logic device 1553 to check for a voltage corresponding to the start of frame for a bit following a sample point reading triggered by the first register 1532.

Generally speaking, the event logic detector 1553 is configured to recognize not only the recessive, dominant, and SOF bits by comparing voltage events, Sample Point events, and the number of time-tick events counted by the counter 1554. In response to detecting a Start of Frame event, the event logic detector 1553 generates a SOF Bit event signal at output 1558. These signals from outputs 1556, and 1557, and 1558 are received by a Protocol Logic Unit (PLU) 1560 that is configured to decode the bit stream received over the control network 1511 according to the CAN protocol.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. A method of communication among two or more modules over a common control network, the method comprising:

sending from a communication device over the common control network a message packet having at least a data portion, the message packet defined by bits having a plurality of bit quanta, wherein data for the message packet is defined by a signal level at defined bit quanta of a bit, the defined bit quanta being less than every bit quanta of a bit;

sending an authentication identifier embedded within the message packet using a portion of the message packet other than the defined bit quanta;

embedding the authentication identifier by one or any combination of 1) setting a voltage value for the bit quanta other than the defined bit quanta to defined values other than and between maximum and minimum expected voltage values for the defined bit quanta, and 2) setting a voltage value for the bit quanta other than the defined bit quanta to either the maximum expected voltage value or the minimum expected voltage values for the defined bit quanta;

receiving the authentication identifier by a receiving module of the common control network;

determining whether the message packet is an authorized message packet based on the authentication identifier.

2. The method of claim 1 further wherein the determining whether the message packet is an authorized message packet comprises comparing the authentication identifier to a list of authentication identifiers of modules connected to the common control network.

3. The method of claim 1 wherein the determining whether the message packet is an authorized message packet comprises comparing the authentication identifier to the receiving module's authentication identifier; and wherein the method further comprises sending an error flag by the receiving module in response to determining that the authentication identifier matches the receiving module's authentication identifier.

4. The method of claim 1 further comprising embedding the authentication identifier in the message packet, which uses a CAN-EF protocol.

5. The method of claim 1 further comprising embedding the authentication identifier by varying bit lengths of the bits for the message packet by one or both of varying length of a bit quanta or adding or removing bit quanta to or from a bit.

6. A communication device apparatus for communicating with other devices over a common control network, the communication device apparatus comprising:

a memory;

a processing device operatively connected to a communication port associated with a receiving module to control receiving and sending communications over the common control network, the processing device configured to:

send a message packet having at least a data portion, the message packet defined by bits having a plurality of bit quanta, wherein data for the message packet is defined by a signal level at defined bit quanta of a bit, the defined bit quanta being less than every bit quanta of a bit;

send an authentication identifier embedded within the message packet using bit quanta other than the defined bit quanta;

embed the authentication identifier by one or any combination of 1) setting a voltage value for the bit quanta other than the defined bit quanta to defined values other than and between maximum and minimum expected voltage values for the defined bit quanta, and 2) setting a voltage value for the bit quanta other than the defined bit quanta to either the maximum expected voltage value or the minimum expected voltage values for the defined bit quanta;

receive the authentication identifier associated with a message received over the common control network;

determine whether the message packet is an authorized message packet based on the authentication identifier.

7. The communication device apparatus of claim 6 wherein the processing device is further configured to determine whether the message packet is an authorized message packet by comparing the authentication identifier to a list of authentication identifiers of modules connected to the common control network.

8. The communication device apparatus of claim 6 wherein the processing device is further configured to determine whether the message packet is an authorized message packet by comparing the authentication identifier to the receiving module's authentication identifier; and wherein the processing device is further configured to send an error flag by the receiving module in response to determining that the authentication identifier matches the receiving module's authentication identifier.

9. The communication device apparatus of claim 6 wherein the processing device is further configured to embed the authentication identifier in the message packet, which uses a CAN-EF protocol.

10. The communication device apparatus of claim 6 wherein the processing device is further configured to embed the authentication identifier by varying bit lengths of the bits for the message packet by one or both of varying length of a bit quanta or adding or removing bit quanta to or from a bit.

11. An apparatus for communication among two or more modules over a common control network, the apparatus comprising:

a memory;

means for sending over the common control network a message packet having at least a data portion, the message packet defined by bits having a plurality of bit quanta, wherein data for the message packet is defined by a signal level at defined bit quanta of a bit, the defined bit quanta being less than every bit quanta of a bit;

means for sending an authentication identifier embedded within the message packet using a portion of the message packet other than the defined bit quanta;

means for embedding the authentication identifier by one or any combination of 1) setting a voltage value for the bit quanta other than the defined bit quanta to defined values other than and between maximum and minimum expected voltage values for the defined bit quanta, and 2) setting a voltage value for the bit quanta other than the defined bit quanta to either the maximum expected voltage value or the minimum expected voltage values for the defined bit quanta;

means for receiving the authentication identifier by a receiving module of the common control network;

means for determining whether the message packet is an authorized message packet based on the authentication identifier.

12. The apparatus of claim 11 further wherein the means for determining whether the message packet is an authorized message packet comprises means for comparing the authentication identifier to a list of authentication identifiers of modules connected to the common control network.

13. The apparatus of claim 11 wherein the means for determining whether the message packet is an authorized message packet comprises means for comparing the authentication identifier to the receiving module's authentication identifier; and wherein the apparatus further comprises means for sending an error flag by the means for receiving in response to determining that the authentication identifier matches the means for receiving's authentication identifier.

14. The apparatus of claim 11 further comprising means for embedding the authentication identifier in the message packet, which uses a CAN-EF protocol.

15. The apparatus of claim 11 further comprising means for embedding the authentication identifier varying bit lengths of the bits for the message packet by one or both of varying length of a bit quanta or adding or removing bit quanta to or from a bit.

* * * * *